United States Patent
Kylväjä et al.

(10) Patent No.: US 8,483,678 B2
(45) Date of Patent: Jul. 9, 2013

(54) NETWORK OPTIMISATION

(75) Inventors: Mikko Kylväjä, Espoo (FI); Jaana Laiho, Veikkola (FI)

(73) Assignee: Nokia Siemens Networks Oy, Espoo (FI)

( * ) Notice: Subject to any disclaimer, the term of this patent is extended or adjusted under 35 U.S.C. 154(b) by 1275 days.

(21) Appl. No.: 11/908,876

(22) PCT Filed: Mar. 14, 2006

(86) PCT No.: PCT/IB2006/000623
§ 371 (c)(1), (2), (4) Date: Sep. 2, 2008

(87) PCT Pub. No.: WO2006/097839
PCT Pub. Date: Sep. 21, 2006

(65) Prior Publication Data
US 2009/0054047 A1 Feb. 26, 2009

(30) Foreign Application Priority Data
Mar. 18, 2005 (GB) .................................. 0505633.8

(51) Int. Cl.
*H04W 24/00* (2009.01)
(52) U.S. Cl.
USPC ..... 455/423; 455/424; 455/67.11; 455/67.13; 455/428
(58) Field of Classification Search
USPC .................... 455/423, 424, 67.11, 67.13, 428
See application file for complete search history.

(56) References Cited

U.S. PATENT DOCUMENTS

| 6,157,838 | A  | * | 12/2000 | Di Huo et al. ................ 455/439 |
| 2001/0039573 | A1 |  | 11/2001 | Collin et al. |
| 2002/0068540 | A1 | * | 6/2002 | Skarman et al. ........... 455/232.1 |
| 2002/0112055 | A1 |  | 8/2002 | Capers et al. |
| 2004/0117226 | A1 | * | 6/2004 | Laiho et al. ....................... 705/7 |
| 2006/0019668 | A1 | * | 1/2006 | Kraiem et al. ................ 455/446 |
| 2006/0046658 | A1 | * | 3/2006 | Cruz et al. ................. 455/67.11 |

FOREIGN PATENT DOCUMENTS

| EP | 1 063 819 A | 12/2000 |
| WO | WO02/080458 A | 10/2002 |

OTHER PUBLICATIONS

International Search Report, PCT/IB2006/000623, mailed Jul. 28, 2006.
Wolf Mende, Eckhard Oppermann, Leif Heitzer,Mobile Radio Network Management Supported by a Planning Tool, *IEEE 1998*, Network Operations and Management Symposium, Feb. 15, 1998, pp. 483-492.

* cited by examiner

*Primary Examiner* — Kiet Doan
*Assistant Examiner* — Dung Lam
(74) *Attorney, Agent, or Firm* — Squire Sanders (US) LLP

(57) ABSTRACT

There is disclosed an apparatus and method for configuring a set of network elements, comprising: selecting the set of network elements; determining a configuration parameter for each network element in the set; measuring a performance parameter dependent upon said configuration parameter for each selected network element; and selectively adjusting the configuration parameter of at least one network element in dependence on the measured performance parameter for said network elements in the set.

40 Claims, 4 Drawing Sheets

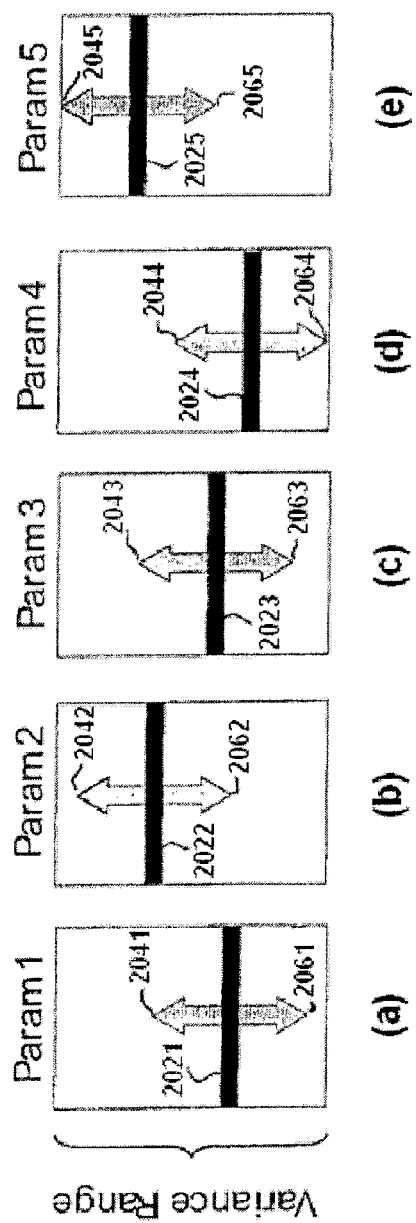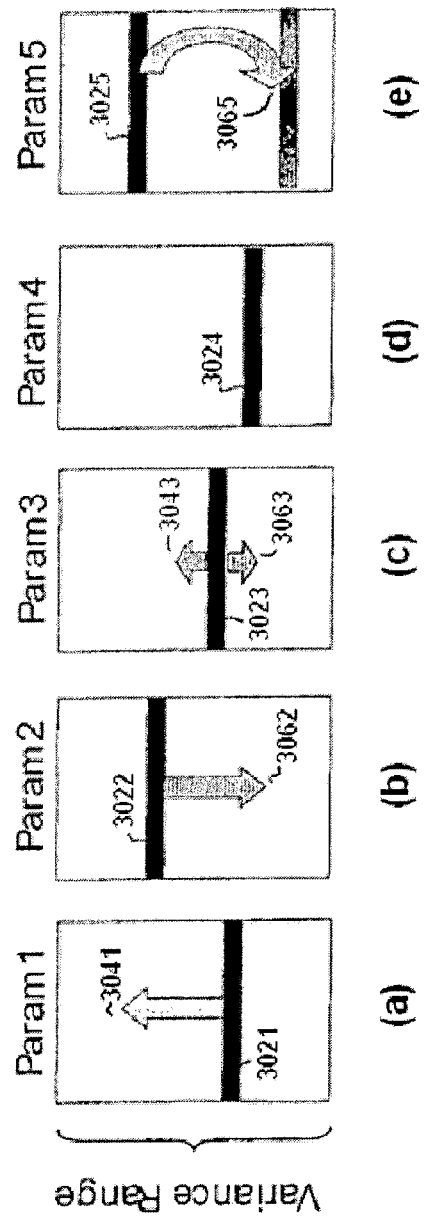

NETWORK OPTIMISATION

BACKGROUND TO THE INVENTION

1. Field of the Invention

The present invention relates to networks, and particularly to the optimisation of network and mobile application performance.

2. Description of the Related Art

Mobile communication systems, such as WCDMA (wideband code division multiple access) and GSM (global system for mobile communications) systems, are examples of complex communication systems. Such systems are known to be impossible to model, predict and simulate perfectly, not least because the phenomena in the systems are of a highly random nature. The systems typically evolve over a long term time period, for example the traffic amount grows and the traffic mix varies over time. The system characteristics change rapidly in the short term. The systems or networks are control systems of a multi-parameter in and multi-parameter out nature.

One of the biggest challenges in cellular networks such as WCDMA and GSM systems is finding an optimal parameter set for the system. The optimisation of the system may be, for example, in terms of quality of service.

These problems, discussed in the context of wireless systems, are also suffered by corporate and other information technology networks.

Known mobile communication systems provide differing levels of complexity in their configuration. In some networks some automated tuning features are provided for a limited amount of parameters, for example for GSM frequencies.

Cellular networks have numerous parameters and counters in different levels of object hierarchy. Different base stations behave differently because of differing radio environments, differing interference sources, and above all different amounts and types of users.

Some key variables in a mobile communication system change slowly over time, but the change is still significant from a network management point of view.

The challenge is to provide a system that can deal with all this, and provide an automated parameter tuning system that works autonomously without user intervention, and can improve network performance.

In operations support system (OSS) optimisation there is a need to be able to optimize multiple parameters simultaneously. Current approaches are to tune one parameter at a time. However if the optimisation is performed one parameter at time, then the optimisation for the next parameter can cancel the effect of the first one.

Known network management systems provide implementations based on manual parameter setting, templates and parameter sets. Even if an algorithm automatically provides, based on measurements, an improved parameter plan, the user (i.e. the network operator) still needs to configure and start the algorithm, verify the results and provision the plan to the network. This requires human intervention.

Reference can be made to the prior art of WO 02/080458 which discusses a method for configuring a network. A clustering method is used to form groups of network sections, data being accessed from the network sections. Configuration takes place a group at a time. A self-organising map (SOM) neural network is used for finding groups.

SUMMARY OF THE INVENTION

It is an aim of the invention and embodiments thereof to provided a technique which addresses one or more of the above-stated problems.

According to the invention there is provided a method of configuring a set of network elements, comprising: selecting the set of network elements; determining a configuration parameter for each network element in the set; measuring a performance parameter dependent upon said configuration parameter for each selected network element; selectively adjusting the configuration parameter of at least one network element in dependence on the measured performance parameter for said network elements in the set.

The configuration parameter of the at least one network element may be adjusted responsive to a value of the measured performance parameter of the at least one network element being less than a value of the measured performance value of at least one further network element.

The configuration parameter of the at least one network element may be adjusted responsive to a value of the measured performance parameter of the at least one network element being a threshold less than a value of the measured performance value of at least one further network element.

The configuration parameter of the at least one network element may be adjusted by scattering the value of the configuration parameter responsive to a value of the measured performance parameter of the at least one network element not being less than a value of the measured performance value of at least one further network element.

The step of selectively adjusting may be performed for a plurality of network elements in the set.

The performance parameter of at least one network element may be additionally dependent upon the configuration parameters of further network elements.

The configuration parameter may be adjusted toward the value of the measured performance value of at least one further network element.

The configuration parameter may be adjusted in steps. Said steps may be of a variable size. The configuration parameter may be adjusted within upper and lower limits.

The step of selecting a set of network elements may include the step of selecting a set of network elements having similar behaviour.

The network elements may be base stations of a mobile communications network.

The selection step may be performed using a neural network algorithm.

The selection step may be performed using a self-organizing map algorithm.

The invention further provides a network element controller for configuring a set of network elements, comprising: selecting means for selecting the set of network elements; determining means for determining a configuration parameter for each network element in the set; measuring means for measuring a performance parameter dependent upon said configuration parameter for each selected network element; selection means for selectively adjusting the configuration parameter of at least one network element, said selection means being adapted to be dependent on the measured performance parameter for said network elements in the set.

The network element may be further adapted to adjust the configuration parameter of the at least one network element responsive to determination of a value of the measured performance parameter of the at least one network element being less than a value of the measured performance value of at least one further network element.

The network element may be further adapted to adjust the configuration parameter of the at least one network element responsive to determination of a value of the measured performance parameter of the at least one network element being a threshold less than a value of the measured performance value of at least one further network element.

The network element may be further adapted to adjust the configuration parameter of the at least one network element by scattering the value of the configuration parameter responsive to determination of a value of the measured performance parameter of the at least one network element not being less than a value of the measured performance value of at least one further network element.

The network element may be further adapted to selectively adjust for each network element in the set.

The network element may be further adapted such that the performance parameter of at least one network element is additionally dependent upon the configuration parameters of further network elements.

The configuration parameter may be adjusted toward the value of the measured performance value of at least one further network element.

The network element may be further adapted to adjust the configuration parameter in steps.

The network element may be further adapted to adjust the configuration parameter in variable steps.

The network element may be further adapted to adjust the configuration parameter in steps.

The configuration parameter may be adjusted within upper and lower limits.

The selection means for selecting a set of network elements may include means for selecting a set of network elements having similar behaviour.

The network elements may be base stations of a mobile communications network.

The invention further provides a network access controller of a mobile communications system, comprising: selecting means for selecting a set of network elements; determining means for determining a configuration parameter for each network element in the set; measuring means for measuring a performance parameter dependent upon said configuration parameter for each selected network element; selection means for selectively adjusting the configuration parameter of at least one network element, said selection means being adapted to be dependent on the measured performance parameter for said network elements in the set.

The network access controller may be a radio network controller.

The network may further include at least one network access point comprising input means for receiving a selective adjustment of a configuration parameter thereof, said adjustment being received from the network access controller The network access point may be a base transceiver station of a mobile communication system.

The network access controller may further be adapted to adjust the configuration parameter of the at least one network element responsive to determination of a value of the measured performance parameter of the at least one network element being less than a value of the measured performance value of at least one further network element.

The network access controller may further be adapted to adjust the configuration parameter of the at least one network element responsive to determination of a value of the measured performance parameter of the at least one network element being a threshold less than a value of the measured performance value of at least one further network element.

The network access controller may further be adapted to adjust the configuration parameter of the at least one network element by scattering the value of the configuration parameter responsive to determination of a value of the measured performance parameter of the at least one network element not being less than a value of the measured performance value of at least one further network element.

The network element controller may be adapted to selectively adjust for each network element in the set.

The network access controller may be adapted such that the performance parameter of at least one network element is additionally dependent upon the configuration parameters of further network elements.

The configuration parameter may be adjusted toward the value of the measured performance value of at least one further network element.

The selection means for selecting a set of network elements may include means for selecting a set of network elements having similar behaviour.

The invention may further provide a network management subsystem of a mobile communications system, comprising: selecting means for selecting a set of network elements; determining means for determining a configuration parameter for each network element in the set; measuring means for measuring a performance parameter dependent upon said configuration parameter for each selected network element; selection means for selectively adjusting the configuration parameter of at least one network element, said selection means being adapted to be dependent on the measured performance parameter for said network elements in the set.

The network may further include at least one network access point comprising input means for receiving a selective adjustment of a configuration parameter thereof, said adjustment being received from the network access controller The network access point may be a base transceiver station of a mobile communication system.

The network management subsystem may be further adapted to adjust the configuration parameter of the at least one network element responsive to determination of a value of the measured performance parameter of the at least one network element being less than a value of the measured performance value of at least one further network element.

The network management subsystem may be further adapted to adjust the configuration parameter of the at least one network element responsive to determination of a value of the measured performance parameter of the at least one network element being a threshold less than a value of the measured performance value of at least one further network element.

The network management subsystem may be further adapted to adjust the configuration parameter of the at least one network element by scattering the value of the configuration parameter responsive to determination of a value of the measured performance parameter of the at least one network element not being less than a value of the measured performance value of at least one further network element.

The network element controller may be adapted to selectively adjust for each network element in the set.

The network management subsystem may be further adapted such that the performance parameter of at least one network element is additionally dependent upon the configuration parameters of further network elements.

The configuration parameter may be further adjusted toward the value of the measured performance value of at least one further network element.

The selection means for selecting a set of network elements may include means for selecting a set of network elements having similar behaviour.

It should be noted that where reference is made in the description or the claims to selection of a configuration parameter, this is to be understood as reference to one or more such parameters.

BRIEF DESCRIPTION OF THE DRAWINGS

The invention is now described by way of example with reference to the accompanying drawings, in which:

FIG. 2 illustrates the variance of configuration parameters in one example;

FIG. 3 illustrates the variance of configuration parameters in another example;

DESCRIPTION OF THE PREFERRED EMBODIMENTS

The invention is described herein by way of reference to an example scenario of a network environment in a mobile communications system. It will be understood, however, that the invention and embodiments thereof are not limited to such a scenario. The broader applicability of the invention to other types of network arrangement will be apparent to one skilled in the art, and is discussed further herein below.

Figure 1:
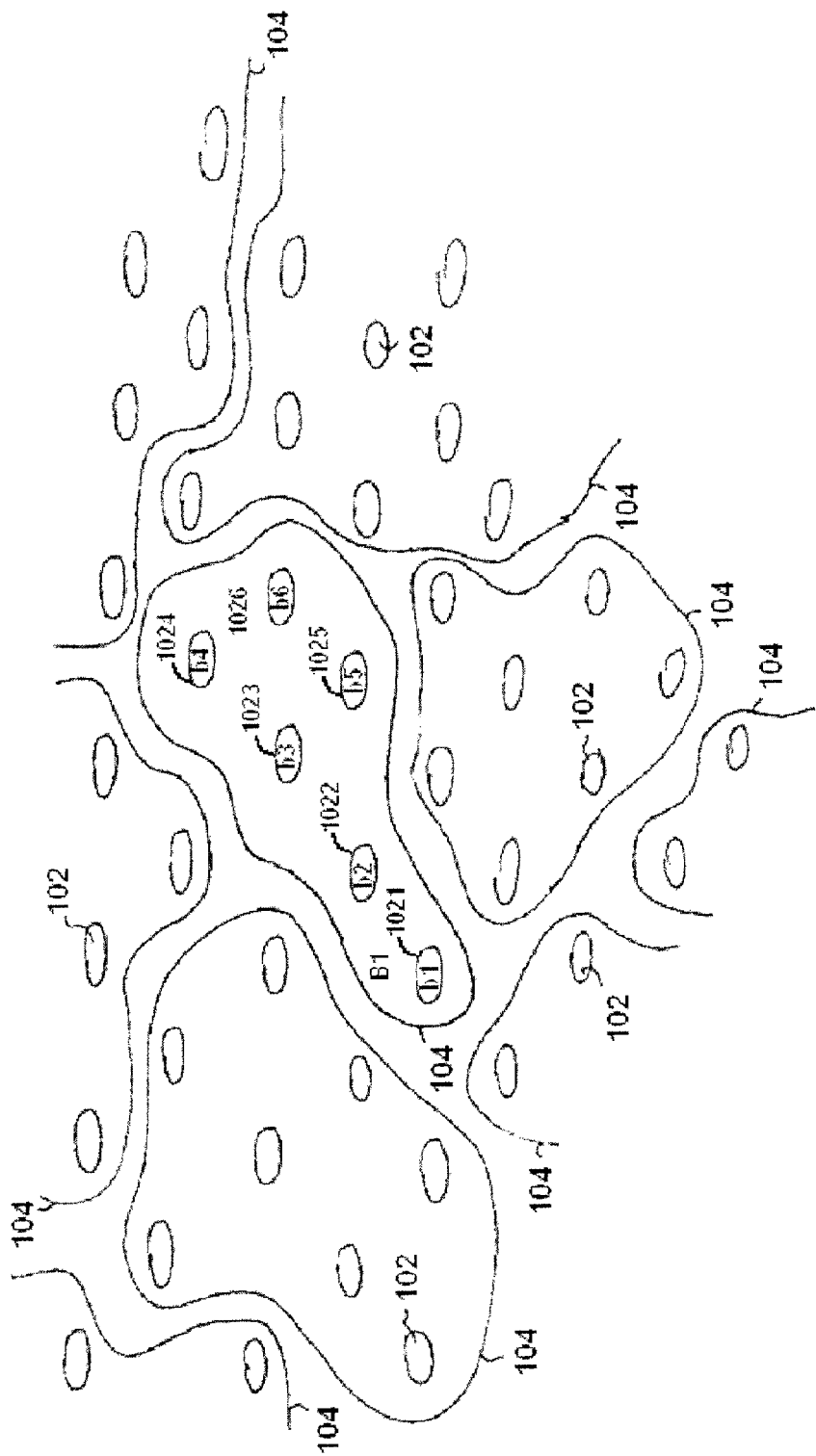
FIG. 1 illustrates an example of a network environment including a plurality of network elements.

Referring to FIG. 1, there is illustrated a plurality of base stations representing a portion of a base station network for a mobile communications system. Selected base stations are denoted by reference numeral 102. In general, the base stations may be considered to be network elements.

The base stations may be grouped into clusters. Each cluster is denoted by reference numeral 104. The base stations are preferably grouped into clusters in accordance with their functionality, with base stations functioning in an essentially similar way being clustered together. By way of example, base stations associated with the same radio interface base transceiver station may be clustered together. There are multiple objectives based on which the cells can be clustered, as will be appreciated by one skilled in the art.

For the purposes of further describing the invention in the context of the embodiment of a mobile communication system, particular attention is now made to one cluster of base stations by way of example. Referring again to FIG. 1, it can be seen that one of the clusters 104 is further labelled $B_1$ and denoted by reference numeral $104_1$. The six base stations 102 included in the cluster $104_1$ are further labelled, respectively, $b_1$, $b_2$, $b_3$, $b_4$, $b_5$, $b_6$ and denoted, respectively, by reference numerals $102_1$, $102_2$, $102_3$, $102_4$, $102_5$, $102_6$.

In general, for the example embodiment, B may be considered to be a set of base stations, such as the set $B_1$, denoted by reference numeral $104_1$. The set B is preferably defined such that the base stations included therein have approximately the same role in the network. However, the base stations may be different types of elements, for example micro base transceiver stations and macro base transceiver stations. The base stations in set B preferably use the same technology, for example the same release, the same licenses, and have the same features enabled, such as GPRS, HSCSD, or HSPPA etc.

In general, p may be considered a set of one or more configuration parameters selected from all the configuration parameters that are available in the base stations. The set of configuration parameters p is preferably selected such that the selected one or more parameters: can be auto-tuned (thus, for example, they cannot be object identifiers); can effect object performance; and the effect of the parameter change can be measured, such that some form of measure counters change when the parameter is changed. The end user, namely the network operator, does not need to know the relationship between the parameter(s) and the counter(s). The set of parameters p is preferably a set of parameters used by each base station in the cluster.

In general, c may be considered a set of counters measured from the network. The counters are used to provide performance parameters based on the configuration parameters, the performance parameters providing a performance measurement. The set c should be such that it reflects the changes in the configuration parameters of the set p.

Each element in B, i.e. each base station, has a p parameter vector, which changes as a function of time. The p vector may be modified manually or by algorithm. A configuration parameter p for each base station b can be generally defined as:

$$p_b = f(t), \text{where } b \in B$$

The counter set c changes as a function of p with time. The counters are mainly effected by the parameters p, but are also effected by random phenomena in the traffic in the base station and in the radio interface. A performance parameter c for each base station b based on each configuration parameter p can be generally defined as:

$$c_b = g(p_b, t), \text{where } b \in B.$$

In some cases, the counter or performance parameter c associated with a given base station is not only effected by the configuration parameter(s) of that base station, but also by the configuration parameter(s) of neighbouring base stations. In which case, for n base stations, the performance parameter or counter set may be redefined as:

$$c_b = g(p_1, \ldots, p_n, t), \text{where } b \in B.$$

The functions f and g cannot generally be defined, because of the complexity of the system and the variation in phenomena over time.

The target or purpose of the system may be defined as being to find a parameter set p for each element in set B, so that the network performance measured by c is as good as possible. It should be noted that the set p includes one or more configuration parameters, and a counter set c includes a corresponding number of one or more performance parameters.

An expert may be able to conclude after a few minutes study, element by element, as to when the vector c is optimal. However this is time consuming, and as the number of measurements and parameters grow is not humanly possible. To find if any change in c has resulted in an improvement or a degradation in network performance, the system needs a cost-function.

With reference to FIG. 2, the principles of an unguided try-and-learn system are illustrated. Such a system tries scattering and deviation of the parameters p in all base stations in B with predefined logic, and then based on c tries to determine whether an improvement has happened. If there is an improvement then the change is maintained, if there is a degradation then the system is returned back to the original configuration parameter(s) of the base station(s).

Referring to FIG. 2, as an example it is assumed that there are a set of five configuration parameters p under consideration, denoted Param1, Param2, Param3, Param4, and Param5. The value of each of the parameters is illustrated graphically, respectively, in FIGS. 2(a) to 2(e). The unit of the values of the parameters, and the nature of the parameters themselves, are not important for this discussion. The principles described can be understood without specifying the exact nature of these parameters or there range of values.

Referring to FIG. 2, there is illustrated an overall variance range possible for each parameter. In each of FIGS. 2(a) to 2(e) there is shown a current value of the respective parameter, denoted by reference numerals $202_1$ to $202_5$ respectively. In each of FIGS. 2(a) to 2(e) there is shown an upward variance toward a respective maximum within the variance, denoted by reference numerals $204_1$ to $204_5$ respectively. In each of FIGS. 2(a) to 2(e) there is shown a downward variance toward a respective minimum within the variance, denoted by reference numerals $206_1$ to $206_5$ respectively.

By varying the respective parameters upward and downwards from a current value, within a given range for each parameter, it is determined whether an improvement or degradation follows in the network performance, and as such the actual value of the parameter is appropriately adjusted.

In accordance with the invention a neural network guided try-and-learn system is provided to improve the network performance. The invention proposes to use a neural network to determine the best direction of parameter change (upwards or downwards). The 'best direction' is the direction—upwards or downwards—which results in an improved performance. In practice, this means that the system does not need as much iteration when finding improvements, and that the system is able to learn from earlier iterations.

This is illustrated in FIG. 3. Referring to FIG. 3, it is assumed (as in FIG. 2) that there are a set of five configuration parameters p under consideration, similarly denoted Param1, Param2, Param3, Param4, and Param5. The value of each of the parameters is illustrated graphically, respectively, in FIGS. 3(a) to 3(e).

Referring to FIG. 3, there is again illustrated an overall variance range possible for each parameter. In each of FIGS. 3(a) to 3(e) there is shown a current value of the respective parameter, denoted by reference numerals $302_1$ to $302_5$ respectively. In FIG. 3(a) there is shown an upward variance toward a respective maximum within the variance, denoted by reference numeral $304_1$. In FIG. 3(b) there is shown a downward variance toward a respective minimum within the variance, denoted by reference numeral $306_2$. In FIG. 3(c) there is shown an upward variance toward a respective maximum within the variance, denoted by reference numeral $304_3$, and a downward variance toward a respective minimum within the variance, denoted by reference numeral $306_3$. In FIG. 3(d) there is shown no variance. In FIG. 3(e) there is shown a downward variance toward a respective minimum within the variance, denoted by reference numeral $306_5$.

The significance of FIG. 3 in comparison to FIG. 2 is that it shows some parameters are varied in only one direction, as it has been determined that varying such parameter in the other direction does not improve system performance. For some parameters (see FIG. 3(c) for example) it is determined that variations in either direction may improve performance.

The use of neural networks improves the solution for many reasons.

A neural network can find similarly behaving base stations, and can be used to learn their parameters. So if a first base station is behaving in a similar way to a second base station (for example they are located near to each other in the neural network), but the first base station has better performance, then the second base station may benefit if the system can iterate the configuration parameter set of the second base station towards that of the first base station.

A neural network can remember data history, so that it is not only the latest data that is analysed. All the data of the system is not stored, which in a fast system could be several gigabytes. A neural network remembers such that if a sample is new it has "more weight" in the neural network than an old sample. In addition very old samples are gradually forgotten.

Neural networks are also suitable for handling large amounts of data and handling long lists of parameters and counters. Also, the performance of neural networks with a large amount of data is better than with conventional solutions.

Figure 4:
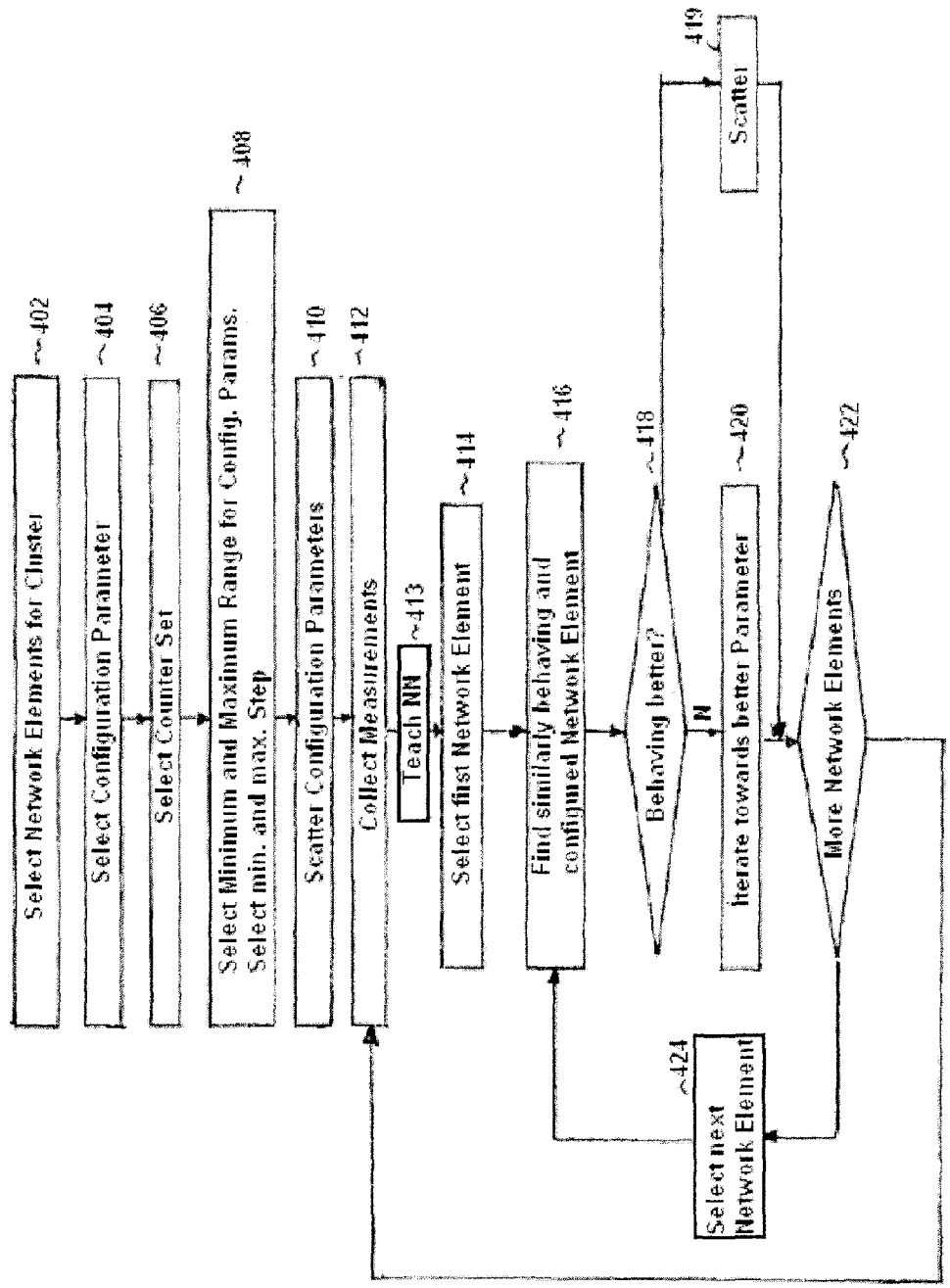
FIG. 4 illustrates a flow process in a preferred embodiment.

The process of operation in accordance with a preferred embodiment of the invention is now described further by way of reference to the flow process of FIG. 4.

In a step 402 the network elements forming a given cluster are selected. In the preferred embodiment, the network elements are base stations of a mobile communications system.

Thereafter, in a step 404, the configuration parameters p for the network elements are selected. This selection results in the determination of one or more configuration parameters, for all the network elements in the cluster, which are to be the subject of network optimisation in accordance with the invention.

Thereafter, in a step 406, the counter set or performance parameters c for each configured parameter p is chosen, being the measurement that will determine the efficiency of any given configuration parameter.

In a step 408, further preparation may be made for the process. A minimum and maximum range for all configuration parameters may be set, beyond which range or variance the configuration parameters may not be varied. The range for individual parameters may vary. In addition, a minimum and maximum step by which any value may be varied may be set.

In a further optional step 410, the current variation between the values of the configuration parameters for each network element may be determined. If there is not much variation, the configuration parameters being of a similar value, then the initial configuration parameters may be scattered, in order to create a random deviation in the configuration parameters.

In a step 412, measurements are collected from the network. Thus, the c vectors are collected from the network, in order to give performance parameters based on each individual configuration parameter.

In a step 413, a neural network is then taught based on the configuration parameters p and the performance parameters c. An old neural network may be the basis of this teaching. Otherwise, a neural network must be created. The neural network may be a SOM. The creation and teaching of the neural network will be known to one skilled in the art. Reference is made to WO 02/080458.

Thereafter, in a step 414, one of the network elements (specifically one of the base stations) is selected. In a step 416 network elements behaving similarly to the selected network element, or configured as the selected network element, are selected.

In a step 418, it is determined whether the selected network element is performing better or worse then the similar network elements. This may be done by comparing the value of the measured performance parameter for the network element to the values, or averaged value, of the similar network elements. There may be only one similar network element.

When determining if performance is getting better or worse, a "reference vector" that may be termed a most optimal operating point (MOOP) may be defined. This vector is defined in same space as a "counter set" which is used to measure the difference in performance responsive to changes in parameters (see description of FIG. 4 below for further discussion). Defining this MOOP-vector is actually trivial; MOOP may describe a base station that is working perfectly (no drops, no unsuccessful functions etc). Then if it is needed to compare two performances, it is necessary only to calculate which is closer to the MOOP. It can be calculated simply with Euclidian distance in Dim(N) space. Theoretically, the step 418 may be performed using neural networks.

If the network element is behaving worse than the similar network elements, then in a step 420 the configuration parameter of the network element is iterated toward the configuration parameter, or averaged parameters, of the similar network elements.

Thereafter, in a step 422, it is determined whether there are further network elements in the cluster. If there are, then in a step 424 the next network element is selected, and the process returns to step 416. If there are no further network elements in the cluster to be considered, then the process returns to step 412.

If in step 418 the network element is determined to be performing well, then no action may be taken and the process may move directly from step 418 to step 422. A network element may be considered to be performing well, for example, if the measured performance parameter is within 5% of the best individual measured performance parameter, or within 5% of the overall averaged measure performance parameters, or within the best 5% performing network elements within the cluster.

If in step 418 it is determined that there is no better performing network element with similar behaviour, then in a step 419 the configuration parameter may be scattered, in order to create a random deviation in the parameters, and the process then moved on to step 422.

After steps 413 to 420 are performed for each network element in the cluster, then the process reverts to step 412 and the steps are repeated.

Rollback, i.e. the return to the initial configuration parameter or the configuration parameter of the preceding iteration, is preferably allowed for in the event that the performance of the element is decreasing dramatically.

The neural network may be advantageously used in various steps of FIG. 4. For example, in step 416 finding similarly behaving base stations can be achieved using neural networks. Neural networks may be essential in this step because they contain a knowledge base of network behaviour (current plus history).

In step 420 a neural network may also be advantageously applied. The iterate toward better behaving parameter(s) can benefit from use of a neural network because they also include information of history parameters and corresponding behaviour.

In steps 416 and 420 one great benefit of using neural networks is that they can handle several parameters at once.

Step 414 is preferably performed without using neural networks, for example by using random selection.

Step 418 is related to the MOOP and could be done with a neutral network (NN).

Figure 5:
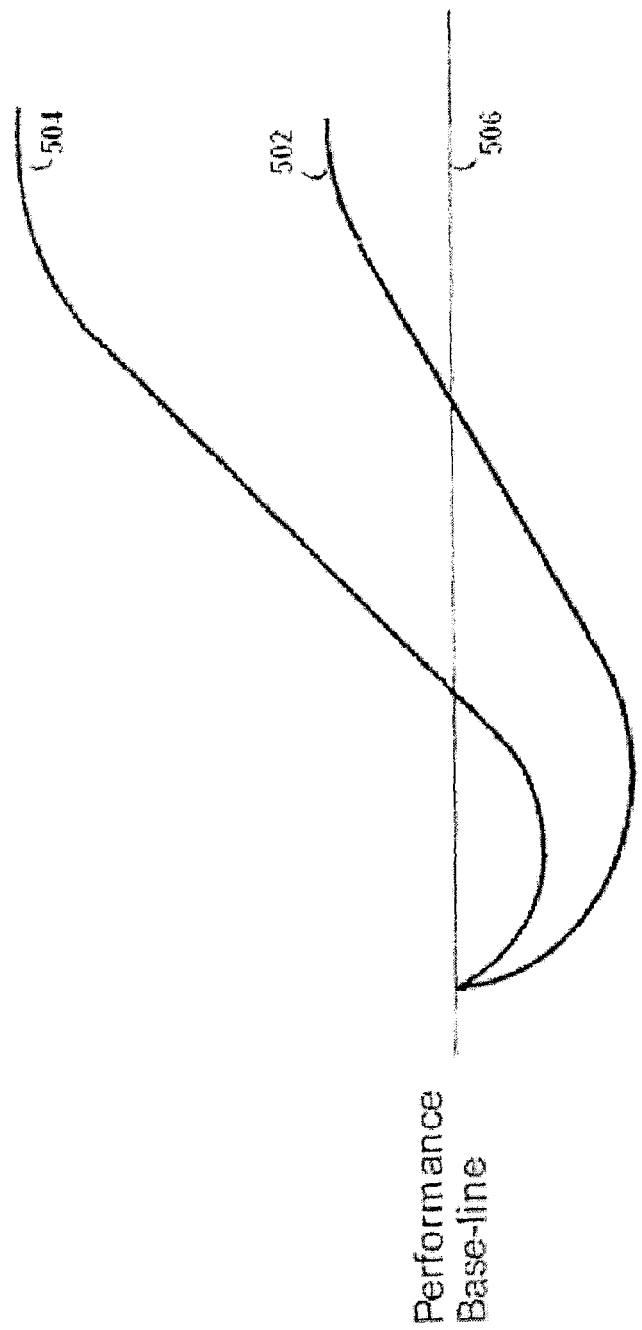
FIG. 5 illustrates the improved performance with preferred embodiments of the invention.

FIG. 5 illustrates a comparison of system performance for the try-and-learn system and for a neural network guided try-and-learn system. In try and learn systems, as represented by graph 502, the performance initially goes down, and then begins to rise. In neural network guided systems, as denoted by graph 504, the performance initially goes down, but not as low as in the pure try-and-learn scenario, and rises to a higher level.

In the neural network guided technique, the time taken (dependent upon the number of iterations) to obtain a positive performance change (over the base-line 506) is shorter.

By using neural networks, already existing measurements can be utilised. The measurement periods per iteration can thus be shorter As a result of all of the above, the neural network method may be used to react quickly to changes in the environment. The neural network method converges faster to an optimal parameter set.

In general, the invention is particularly advantageously applicable to complex communication systems having the following properties:
1) The system is impossible to model, predict and simulate perfectly. Phenomena in the system are of highly random nature.
2) The system is evolving over a long-term time period (e.g. the traffic amount is growing and traffic mix is varying).
3) The system is changing rapidly in the short term.
4) The system is multi-parameter in, multi-parameter out.

Although described in the context of a mobile communications system, in which the network elements are base stations, the invention is more generally applicable. In particular, the invention may be used generally in any network environment, such as computer systems or other information technology related application.

The functionality of the invention may be implemented in any suitable element of a network. In a mobile communications system, this functionality may be implemented in a base station controller or a radio network controller for example. However the functionality may also be implemented elsewhere. In one possible implementation it is proposed to implement the functionality of the invention in a network element controller, being a control entity which provides some control of elements in a network. The network element controller may be provided as part of a management system, or simply in a dedicated network element.

The invention has been described herein by way of reference to particular non-limiting examples. One skilled in the art will appreciate that the invention may have more broader applicability than is described herein. The scope pf protection afforded by the invention is defined by the appended claims.

The invention claimed is:

1. A method of configuring a set of network elements, comprising:
selecting the set of network elements,
determining, by a machine, a configuration parameter for each network element in the set;
measuring a performance parameter dependent upon said configuration parameter for each selected network element; and
selectively adjusting, by the machine, the configuration parameter of at least one network element in dependence on the measured performance parameter for said network elements in the set, wherein the configuration parameter of the at least one network element is adjusted responsive to a value of the measured performance parameter of the at least one network element being a threshold less than a value of the measured performance value of at least one further network element.

2. A method according to claim 1 wherein the configuration parameter of the at least one network element is adjusted by scattering the value of the configuration parameter responsive to a value of the measured performance parameter of the at least one network element not being less than a value of the measured performance value of at least one further network element.

3. A method according to claim 1 wherein the step of selectively adjusting is performed for a plurality of network elements in the set.

4. A method according to claim 1 wherein the performance parameter of at least one network element is additionally dependent upon the configuration parameters of further network elements.

5. A method according to claim 1 wherein the configuration parameter is adjusted toward the value of the measured performance value of at least one further network element.

6. A method according to claim 1 wherein the configuration parameter is adjusted in steps.

7. A method according to claim 6 wherein said steps are of a variable size.

8. A method according to claim 1 wherein the configuration parameter is adjusted within upper and lower limits.

9. A method according to claim 1 wherein the step of selecting a set of network elements includes the step of selecting a set of network elements having similar behaviour.

10. A method according to claim 1 wherein the network elements are base stations of a mobile communications network.

11. A method according to claim 1 wherein the selection step is performed using a neural network algorithm.

12. A method according to claim 1 wherein the selection step is performed using a self-organizing map algorithm.

13. A network element controller for configuring a set of network elements, comprising:
    at least one processor; and
    at least one memory including computer program code,
    wherein the at least one memory and computer program code are configured to, with the at least one processor, cause the controller at least to
    select the set of network elements;
    determine a configuration parameter for each network element in the set;
    measure a performance parameter dependent upon said configuration parameter for each selected network element;
    selectively adjust the configuration parameter of at least one network element in dependence on the measured performance parameter for said network elements in the set; and
    adjust the configuration parameter of the at least one network element responsive to determination of a value of the measured performance parameter of the at least one network element being a threshold less than a value of the measured performance value of at least one further network element.

14. A network element controller according to claim 13 further adapted to adjust the configuration parameter of the at least one network element by scattering the value of the configuration parameter responsive to determination of a value of the measured performance parameter of the at least one network element not being less than a value of the measured performance value of at least one further network element.

15. A network element controller according to claim 13 wherein the network element controller is adapted to selectively adjust for each network element in the set.

16. A network element controller according to claim 13 further adapted such that the performance parameter of at least one network element is additionally dependent upon the configuration parameters of further network elements.

17. A network element controller according to claim 13 wherein the configuration parameter is adjusted toward the value of the measured performance value of at least one further network element.

18. A network element controller according to claim 13 wherein the network element controller is adapted to adjust the configuration parameter in steps.

19. A network element controller according to claim 18 wherein the network element controller is adapted to adjust the configuration parameter in variable steps.

20. A network element controller according to claim 13 wherein the network element controller is adapted to adjust the configuration parameter in steps.

21. A network element controller according to claim 13 wherein the configuration parameter is adjusted within upper and lower limits.

22. A network element controller according to claim 13 wherein the at least one memory and computer program code are configured to, with the at least one processor, cause the controller at least to select a set of network elements having similar behaviour.

23. A network element controller according to claim 13 wherein the network elements are base stations of a mobile communications network.

24. A network access controller of a mobile communications system, comprising:
    at least one processor; and
    at least one memory including computer program code,
    wherein the at least one memory and computer program code are configured to, with the at least one processor, cause the controller at least to
    select a set of network elements;
    determine a configuration parameter for each network element in the set;
    measure a performance parameter dependent upon said configuration parameter for each selected network element;
    selectively adjust the configuration parameter of at least one network element in dependence on the measured performance parameter for said network elements in the set; and
    adjust the configuration parameter of the at least one network element responsive to determination of a value of the measured performance parameter of the at least one network element being a threshold less than a value of the measured performance value of at least one further network element.

25. A network access controller according to claim 24 being a radio network controller.

26. A network access controller according to claim 24 wherein the network further includes at least one network access point comprising an input configured to receive a selective adjustment of a configuration parameter thereof, said adjustment being received from the network access controller.

27. A network access controller according to claim 26 wherein the network access point is a base transceiver station of a mobile communication system.

28. A network access controller according to claim 24 further adapted to adjust the configuration parameter of the at least one network element by scattering the value of the configuration parameter responsive to determination of a value of the measured performance parameter of the at least one network element not being less than a value of the measured performance value of at least one further network element.

29. A network access controller according to claim 24 wherein the network element controller is adapted to selectively adjust for each network element in the set.

30. A network access controller according to claim 24 further adapted such that the performance parameter of at least one network element is additionally dependent upon the configuration parameters of further network elements.

31. A network access controller according to claim 24 wherein the configuration parameter is adjusted toward the value of the measured performance value of at least one further network element.

32. A network access controller according to claim 24 wherein the at least one memory and computer program code are configured to, with the at least one processor, cause the controller at least to select a set of network elements having similar behaviour.

33. A network management subsystem of a mobile communications system, comprising:
  at least one processor; and
  at least one memory including computer program code,
  wherein the at least one memory and computer program code are configured to, with the at least one processor, cause the subsystem at least to
  select a set of network elements;
  determine a configuration parameter for each network element in the set;
  measure a performance parameter dependent upon said configuration parameter for each selected network element; and
  selectively adjust the configuration parameter of at least one network element in dependence on the measured performance parameter for said network elements in the set,
  adjust the configuration parameter of the at least one network element responsive to determination of a value of the measured performance parameter of the at least one network element being a threshold less than a value of the measured performance value of at least one further network element.

34. A network management subsystem according to claim 33 wherein the network further includes at least one network access point comprising an input configured to receive a selective adjustment of a configuration parameter thereof, said adjustment being received from the network access controller.

35. A network management subsystem according to claim 34 wherein the network access point is a base transceiver station of a mobile communication system.

36. A network management subsystem according to claim 33 further adapted to adjust the configuration parameter of the at least one network element by scattering the value of the configuration parameter responsive to determination of a value of the measured performance parameter of the at least one network element not being less than a value of the measured performance value of at least one further network element.

37. A network management subsystem according to claim 33 wherein the network element controller is adapted to selectively adjust for each network element in the set.

38. A network management subsystem according to claim 33 further adapted such that the performance parameter of at least one network element is additionally dependent upon the configuration parameters of further network elements.

39. A network management subsystem according to claim 33 wherein the configuration parameter is adjusted toward the value of the measured performance value of at least one further network element.

40. A network management subsystem according to claim 33 wherein the at least one memory and computer program code are configured to, with the at least one processor, cause the controller at least to select a set of network elements having similar behaviour.

* * * * *